(12) United States Patent
Kim

(10) Patent No.: US 6,590,367 B2
(45) Date of Patent: Jul. 8, 2003

(54) EXTERNAL TYPE REGULATOR FOR VEHICLE ALTERNATOR

(75) Inventor: Do-Kun Kim, Kyongju-si (KR)

(73) Assignee: Valeo Mando Electrical Systems Korea Limited, Kyongsangbuk-do (KR)

(*) Notice: Subject to any disclaimer, the term of this patent is extended or adjusted under 35 U.S.C. 154(b) by 0 days.

(21) Appl. No.: 10/159,947

(22) Filed: May 29, 2002

(65) Prior Publication Data

US 2003/0020438 A1 Jan. 30, 2003

(30) Foreign Application Priority Data

Jul. 27, 2001 (KR) .................................... 2001-0045329

(51) Int. Cl.[7] .............................. G05F 1/40; H02K 7/06
(52) U.S. Cl. ......................... 323/266; 307/10.1; 322/28
(58) Field of Search ................................. 323/266, 272, 323/282, 284; 363/89, 90, 95; 322/25, 27, 28, 29, 33; 307/10.1, 10.7, 10.5

(56) References Cited

U.S. PATENT DOCUMENTS

| | | | |
|---|---|---|---|
| 4,503,365 A | * 3/1985 | Kirk ............................. | 361/58 |
| 4,791,349 A | * 12/1988 | Mink .......................... | 323/266 |
| 5,982,158 A | * 11/1999 | Schnars et al. ............. | 323/273 |
| 6,507,178 B2 | * 1/2003 | Cocctta et al. .............. | 323/313 |

* cited by examiner

Primary Examiner—Rajnikant B. Patel
(74) Attorney, Agent, or Firm—R. Neil Sudol; Henry D. Coleman; William J. Sapone

(57) ABSTRACT

The present invention relates to an external type regulator for a vehicle alternator, and in particular to an external type regulator for a vehicle alternator which is capable of preventing a damage of electric parts and a battery by stopping a power generation by disconnecting a field current flowing in a field coil through a relay in the case that an over charge occurs in an alternator due to a damage of a regulator. The regulator for a vehicle alternator includes an over charge disconnector which includes a dividing resistor for dividing a voltage inputted through an IG terminal, a zenor diode which is turned off in the case that the voltage divided by the dividing resistor is higher than a zenor voltage, for thereby detecting an over charge of an alternator which occurs in an IG terminal, first and second transistors which are turned on when the zenor diode detects an over charge and is turned on and output a relay driving signal, a relay which has a contact point terminal connected between a power transistor and a field coil of the voltage adjusting unit and switch-driven in response to a relay driving signal when the first transistor is turned on, for thereby disconnecting a field current flowing between the power transistor and the field coil, and a plurality of resistors, condensers and diodes, whereby the over charge disconnector stops a power generation of the alternator by detecting an over charge of the alternator and disconnecting a field current flowing in the field coil.

2 Claims, 3 Drawing Sheets

[Fig. 1]
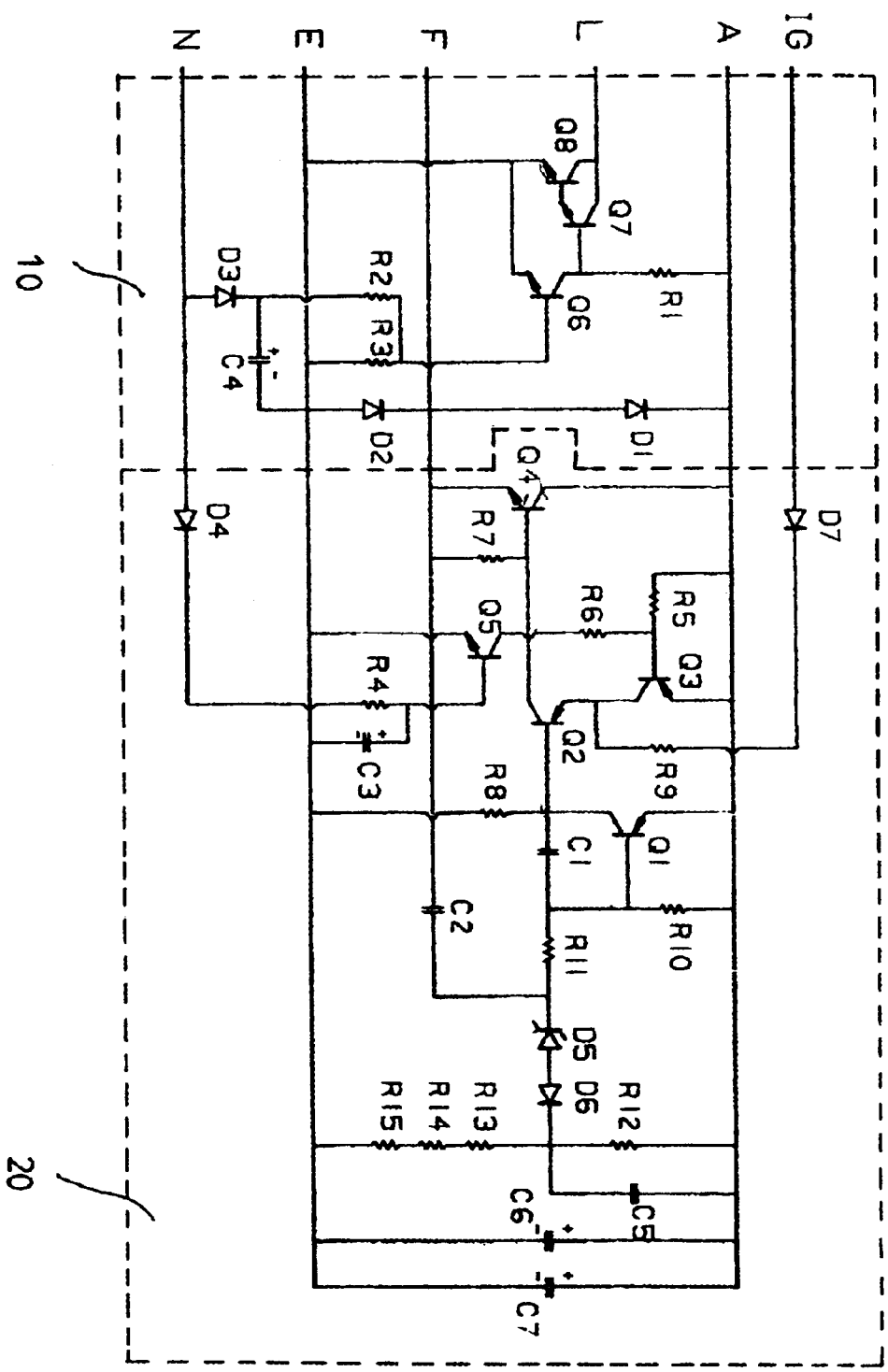

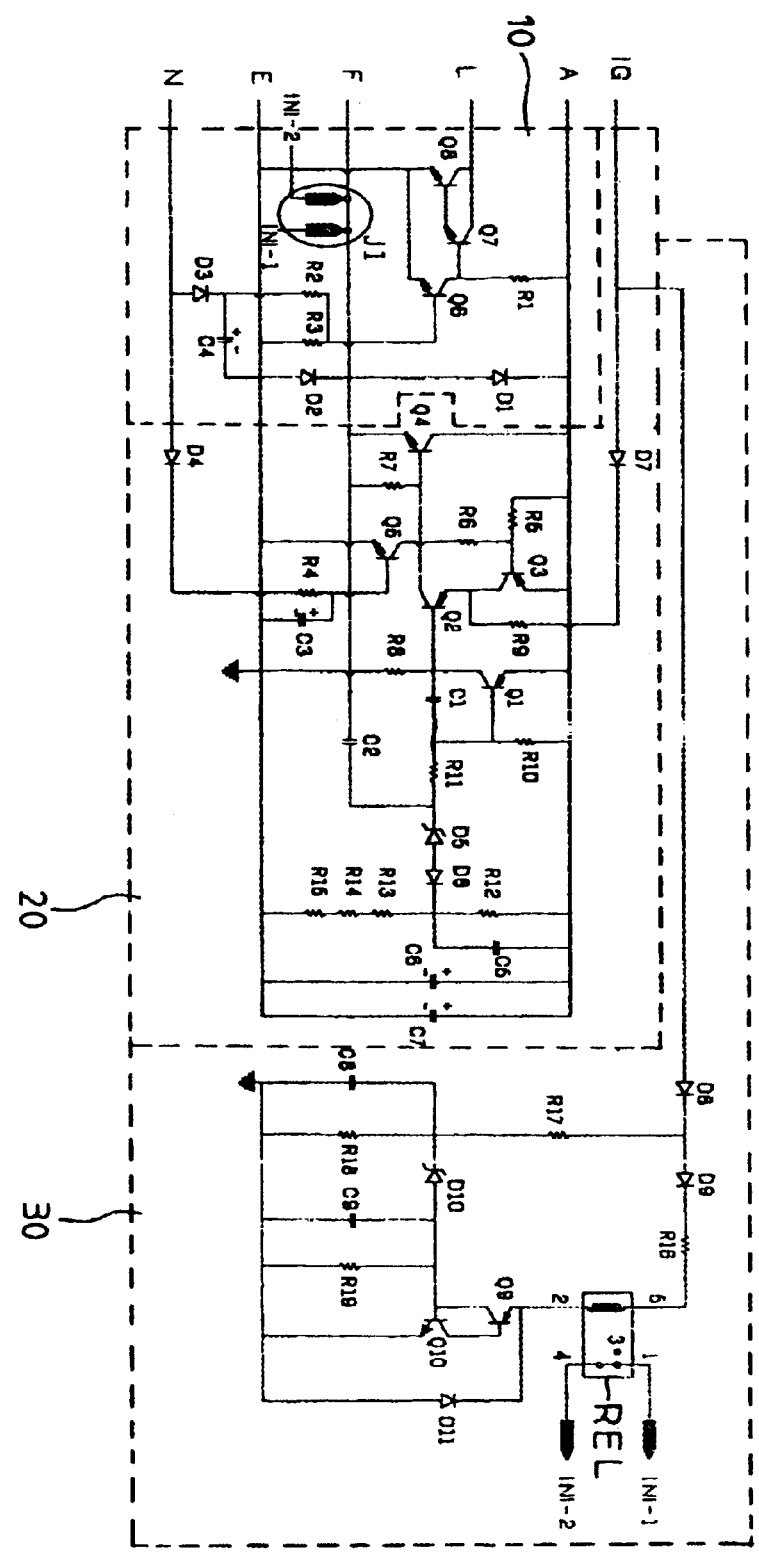
[Fig. 2]

[Fig. 3]
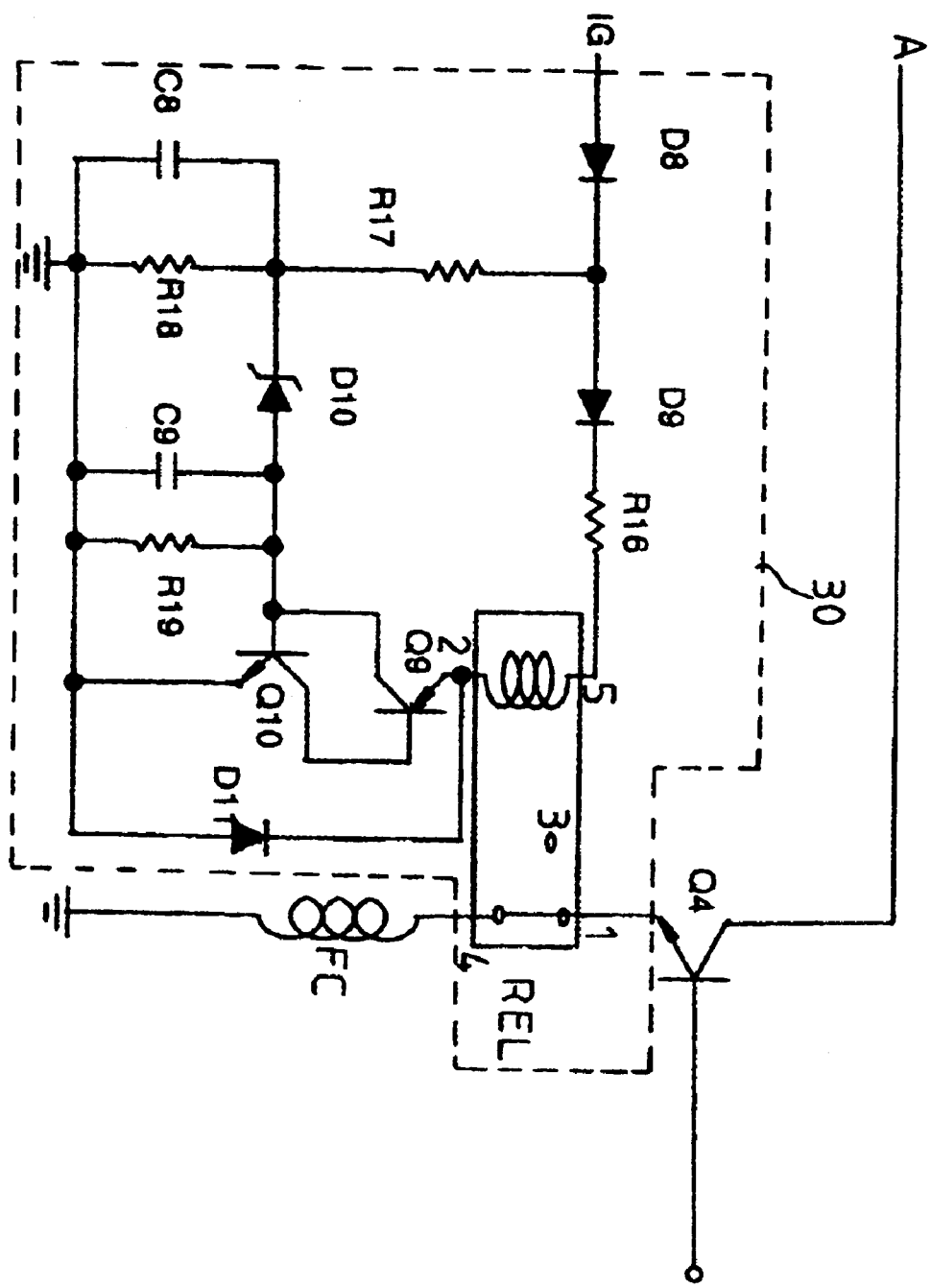

EXTERNAL TYPE REGULATOR FOR VEHICLE ALTERNATOR

BACKGROUND OF THE INVENTION

1. Field of the Invention

The present invention relates to an external type regulator for a vehicle alternator, and in particular to an external type regulator for a vehicle alternator which is capable of preventing a damage of electric parts and a battery by stopping a power generation by disconnecting a field current flowing in a field coil through a relay in the case that an over charge occurs in an alternator due to a damage of a regulator.

2. Description of the Background Art

Generally, a vehicle includes various electric apparatuses such as lamps, air conditioner, etc. including an electric part such as a starting apparatus or ignition apparatus of an engine. A battery and alternator supply a power to the above parts.

Namely, the alternator is connected with an engine by a certain belt. The generated power is determined based on the revolution of the engine. In the case that the generated power of the alternator is smaller than the load of various electric parts, namely, the load generated by load elements, the battery temporarily charges as a power source, so that the power charged in the battery is supplied to various load elements. In the case that the generated power of the alternator is larger than the load generated in various load elements, only the alternator supplies the power to all load elements, and the battery is charged by the alternator.

At this time, a regulator is used together with the alternator for supplying a power proper to various loads and charging a battery by a certain amount by controlling the output voltage of the alternator by controlling the field current flowing in the field coil of the alternator.

FIG. 1 is a view illustrating a regulator for a conventional vehicle alternator. The above regulator includes a charge lamp controller 10 for controlling in order for a charge lamp to be turned on when a vehicle is in a key-switch on state and in order for the charge lamp to be turned off when the engine starts, and the alternator generates the power, and a voltage adjusting unit 20 for controlling in order for the output voltage of the alternator to be constantly maintained as an adjusted voltage.

In the case of the charge controller 10, when the key switch of the vehicle is turned on, the current of the battery (not shown) is inputted into a terminal L connected with the charge lamp (not shown) through an ignition key (not shown). When the current flowing from the terminal A connected with an output voltage terminal of the alternator (not shown) through a resistor R1 is inputted into a base terminal of a transistor Q7, the transistor Q7 is turned on, and a transistor Q8 is turned on, so that the current of the battery inputted into the terminal L flows to the earth terminal E through the transistor Q8, whereby the charge lamp is turned on.

In addition, when the alternator generates power as the engine starts, the current flowing from the terminal A through the resistor R1 is inputted into a collector terminal of a transistor Q6. When the current flowing from a terminal N connected with the center point of the alternator through a diode D3 and the resistor R2 is inputted into a base terminal of the transistor Q6, the transistor Q6 is turned on, and the transistors Q7 and Q8 are turned off, so that the current of the battery does not flow to the charge lamp connected with the terminal L. Namely, the current directly flows to the terminal E for thereby turning off the charge lamp.

In the case of the voltage adjusting unit 20, the current of the battery is inputted into the IG terminal connected with the ignition key and is inputted into the collector terminal of the transistor Q2 through the diode D7 and a resistor R9. When the current flowing from the terminal F connected with the field coil (not shown) through a condenser C2, a resistor R11 and a condenser C1 is inputted into a base terminal of the transistor Q2, the transistor Q2 is turned on, and the current flowing in an emitter terminal is inputted into a base terminal of the power transistor Q4 directly connected with the terminal A.

Therefore, the power transistor Q4 is turned on, and the current of an emitter terminal flows to the field coil through the terminal F for thereby first exciting the field coil.

The output voltage of the alternator becomes constant as described in the following operation.

When the output voltage of the alternator is higher than the adjusting voltage, the transistor Q1 directly connected with the terminal A is turned on. Therefore, the current directly flows to the terminal E through a resistor R8. As the transistor Q1 is turned on, when the output voltage of a resistor R11 is higher than the conducting voltage of a zenor diode D5, the zenor diode D5 is turned on, and the current flows to the terminal E through the transistor Q1, the resistor R11, the zenor diode D5, the diode D6 and the resistors R13, R14 and R15.

Therefore, the current is not inputted into a base terminal of the transistor Q2, and the power transistor Q4 is turned off. So, the current does not flow to the field coil connected with the terminal F, so that it is impossible to generate power, whereby the generating voltage is decreased.

Next, when the output voltage of the alternator becomes lower than the adjusting voltage, namely, as the output voltage of the alternator at the resistor R11 is lower than the conducting voltage of the zenor diode D5, when the zenor diode D5 is turned off, and the transistor Q1 is turned off, the current flowing from the terminal N to the diode D4 and the resistor R4 is inputted into a base terminal of the transistor Q5. When the transistors Q3 and A2 are turned on by the current flowing in the terminal A, the power transistor Q4 is turned on, and the current flowing in the terminal A flows to the terminal E through the field coil connected with the terminal F through the power transistor Q4, so that the generating voltage is increased.

In the conventional art, the above described operation is repeatedly performed at a very high speed for thereby maintaining the voltage generation of the alternator as a uniform adjusting voltage.

In the conventional art, the heat sink which is a kind of heat radiating plate is used for preventing an over heating phenomenon of the power transistor Q4 in the voltage adjusting unit 20.

Namely, if the power transistor Q4 becomes a short circuit state due to the over heating of the power transistor Q4, the regulator does not normally perform the regulation function.

In the conventional art, the over heating problem of the power transistor Q4 is prevented using the heat sink in the above described manner. However, since the heat sink is simply fixed using screws at a certain portion of a substrate on which the power transistor Q4 is mounted, if the screws are not properly fixed, a non-contact problem may occur, so that the heat sink may not normally operate.

Namely, when the heat sink function is not properly performed, the over heating problem of the power transistor Q4 may occur, so that the power transistor Q4 may be critically damaged. Furthermore, the regulator may be damaged, so that the over change problem may occur in the alternator. Therefore, the electric parts of the vehicle may be critically damaged due to the over charge of the alternator. In addition, the battery may be damaged for thereby decreasing the life span of the battery.

SUMMARY OF THE INVENTION

Accordingly, it is an object of the present invention to provide an external type regulator for a vehicle alternator which overcomes the problems encountered in the conventional art.

It is another object of the present invention to provide an external type regulator for a vehicle alternator which is capable of preventing any damage of electric parts and battery of a vehicle by detecting an over charge of an alternator through a zenor diode in the case that an over charge occurs in an alternator due to a damage of a regulator and stopping a power generation of an alternator by disconnecting a field current flowing between a power transistor and a field coil through a relay driven by two transistors.

In order to achieve the above objects, there is provided an external type regulator for a vehicle alternator which includes an over charge disconnector which includes a dividing resistor for dividing a voltage inputted through an IG terminal, a zenor diode which is turned off in the case that the voltage divided by the dividing resistor is higher than a zenor voltage, for thereby detecting an over charge of an alternator which occurs in an IG terminal, first and second transistors which are turned on when the zenor diode detects an over charge and is turned on and outputs a relay driving signal, a relay which has a contact point terminal connected between a power transistor and a field coil of the voltage adjusting unit and being switch-driven in response to a relay driving signal when the first transistor is turned on, for thereby disconnecting a field current flowing between the power transistor and the field coil, and a plurality of resistors, condensers and diodes, whereby the over charge disconnector stops a power generation of the alternator by detecting an over charge of the alternator and disconnecting a field current flowing in the field coil.

BRIEF DESCRIPTION OF THE DRAWINGS

The present invention will become better understood with reference to the accompanying drawings which are given only by way of illustration and thus are not limitative of the present invention, wherein;

FIG. 1 is a view illustrating a regulator for a conventional vehicle regulator;

FIG. 2 is a view illustrating an external type regulator for a vehicle alternator according to the present invention; and FIG. 3 is a view illustrating an over voltage breaker of FIG. 2 according to the present invention.

DETAILED DESCRIPTION OF THE PREFERRED EMBODIMENTS

The preferred embodiments of the present invention will be described with reference to the accompanying drawings.

FIG. 2 is a view illustrating an external type regulator for a vehicle alternator according to the present invention. When a key switch of a vehicle is turned on, a charge lamp is turned on. In this state, when an engine starts, and an alternator generates power. In the above described system, a charge lamp controller 10 controls in order for a charge lamp to be turned off. A voltage adjusting unit 20 controls in order for an output voltage of an alternator to be uniform as an adjusting voltage. An over charge disconnector 30 disconnects a field current flowing in a field coil by detecting an over charge of an alternator and controls in order for the alternator not to generate power.

At this time, the charge lamp controller 10 includes a plurality of resistors R1, R2 and R3, transistors Q6, Q7 and Q8, diodes D1, D2 and D3, and a condenser C4 which are connected to each terminal. The voltage adjusting unit 20 includes a plurality of resistors R4 through R15, transistors Q1 through Q3, a power transistor Q4, diodes D4. D6 and D7, a zenor diode D5 and condensers C1, C2 and C3 which are connected to each terminal. The above construction is the same as the conventional construction except for the following inventive construction.

As shown in FIG. 3, the over charge disconnector 30 includes dividing resistors R17 and R18 for dividing a voltage inputted through the IG terminal, a zenor diode D10 which is turned on when the voltage divided by the dividing resistors R17 and R18, is higher than the zenor voltage for thereby detecting an over charge of the alternator in the IG terminal, transistors Q9 and Q10 which are turned on and output a relay driving signal when the zenor diode D10 detects the over charge and is turned on, and a relay REL which includes a contact point terminal connected between the power transistor Q4 and the field coil FC in the voltage adjusting unit 20 and disconnects the field current between the power transistor Q4 and the field coil FC as the contact terminal switch-operates based on a relay driving signal when the transistor Q9 is turned on.

In addition, there are provided a plurality of resistors R16, R18 and R19, condensers C8 and C9, and diodes D8, D9 and D11.

At this time, the transistor Q9 is a PNP type transistor, and the transistor Q10 is a NPN type transistor. The transistor Q9 and the transistor Q10 are connected in series.

In addition, the first terminal of the relay REL is connected with an emitter terminal of the power transistor Q4, and the second terminal is connected with a collector terminal of the transistor Q9, and the fourth terminal is connected with the field coil FC, and the fifth terminal is connected with the resistor R16. The contact point terminal is connected with the first terminal and the fourth terminal until the over charge of the alternator is detected, so that the field current is not disconnected between the power transistor Q4 and the field coil FC.

As shown in FIG. 2, in the terminal connection of the relay REL, the terminals INI-1 and INI-2 connected with the first and fourth terminals of the relay REL are connected with the terminals INI-1 and INI-2 terminals in the J1 connected with the terminal F, and the first terminal is connected with an emitter terminal of the power transistor Q4, and the fourth terminal is connected with the field coil FC.

The operation of the external type regulator for a vehicle alternator according to the present invention will be described.

Here, in the case of the external type regulator for a vehicle alternator according to the present invention, since the charge lamp turning on and off control and the voltage adjusting control for maintaining the output voltage of the alternator as a uniform adjusting voltage are same as the operation of the conventional regulator, the detailed description thereof will be omitted.

Therefore, the operation of the over charge disconnector 30 according to the present invention will be described in detail.

Namely, in the case that the collector terminal and emitter terminal of the power transistor Q4 become short-circuit due to the over heating of the power transistor Q4 or the field coil FC becomes short-circuit, or in the case that the regulator does not operate normally because a certain element of the regulator is damaged, the regulator may be damaged, so that an over charge problem occurs.

In the above state, the over charge disconnector 30 divides the voltage of the current flowing from the IG terminal through the diode D8 using the dividing resistors R17 and R18, so that the voltage of the dividing resistor R18 is inputted into the zenor diode D10.

At this time, the zenor diode D10 detects an over charge of the alternator using a zenor vltage.

Namely, if the voltage inputted into the zenor diode D10 is higher than the zenor voltage, it means that an over charge occurs in the alternator, so that the over charge of the alternator is checked. Thereafter, the zenor diode D10 is turned on, and the current is inputted into a base terminal of the transistor Q10.

The NPN type transistor Q10 is turned on, and the series-connected PNP type transistor Q9 is turned on, and the current flows in the coil of the relay REL connected between the transistor Q9 and the resistor R16, so that the contact point terminal connected with the first terminal of the relay REL is switched to the third terminal for thereby changing the contact point.

Therefore, the field current flowing between the power transistor Q4 and the field coil FC is disconnected, and the alternator does not generate power, so that the over charge of the alternator applied to the regulator is disconnected, whereby it is possible to prevent any damage of the electric parts and battery of the vehicle.

In the present invention, when the over charge occurs, the relay is quickly operated and maintains a turned-on state until the power is disconnected. In particular, since two transistors are used for driving the relay REL, it is possible to prevent a short-circuit problem due to the heat and over current because a turning on/off contact time of the relay REL is fast compared to when using one transistor.

In addition, in the present invention, an alarm indication light is installed in a lower portion of a display panel in a driving seat of a vehicle, so that an error information of a regulator occurring when a regulator is damaged is indicated based on a light turning on/off operation, whereby a driver easily recognizes the error state of the regulator. Therefore, in the present invention, it is possible to accurately recognize other abnormal parts and product and check the error position.

The present invention is basically directed to an external type regulator and is capable of decreasing a cost by changing only damaged regulator compared to the conventional internal type regulator which is installed together with the alternator.

As described above, in the present invention, in the case that an over charge occurs in the alternator due to a damage of a regulator, the over charge of the alternator is detected through the zenor diode. The field current flowing between the power transistor and the field coil through the relay driven by two transistors is disconnected, and the alternator stops the power generation. Therefore, it is possible to prevent the electric parts and battery of a vehicle from being damaged by an over charge.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an external type regulator for a vehicle alternator which includes a charge lamp controller for controlling a turning on/off operation of a charge lamp, and a voltage adjusting unit for constantly adjusting an output voltage of the alternator, the external type regulator for a vehicle alternator, comprising:

an over charge disconnector which includes:
a dividing resistor for dividing a voltage inputted through an IG terminal;
a zenor diode which is turned off in the case that the voltage divided by the dividing resistor is higher than a zenor voltage, for thereby detecting an over charge of an alternator which occurs in an IG terminal;
first and second transistors which are turned on when the zenor diode detects an over charge and is turned on and output a relay driving signal;
a relay which has a contact point terminal connected between a power transistor and a field coil of the voltage adjusting unit and is switch-driven in response to a relay driving signal when the first transistor is turned on, for thereby disconnecting a field current flowing between the power transistor and the field coil; and a plurality of resistors, condensers and diodes, whereby said over charge disconnector stops a power generation of the alternator by detecting an over charge of the alternator and disconnecting a field current flowing in the field coil.

2. The regulator of claim 1, wherein said first transistor of the over charge disconnector is a PNP type transistor, and said second transistor is a NPN type transistor, and said first transistor and second transistors are connected in series.

* * * * *